United States Patent [19]

Webb

[11] Patent Number: 4,621,697

[45] Date of Patent: Nov. 11, 1986

[54] GARDEN TILLER ATTACHMENT

[76] Inventor: Roger C. Webb, 6028 Harrison, Kansas City, Mo. 64110

[21] Appl. No.: 710,049

[22] Filed: Mar. 11, 1985

[51] Int. Cl.[4] .................... A01B 33/06; A01B 33/00; A01B 73/00

[52] U.S. Cl. ...................................... 172/42; 172/57; 172/59; 172/240

[58] Field of Search ........................ 172/41, 42, 43, 57, 172/58, 240, 250; 280/47.13 R; D15/11, 12

[56] References Cited

U.S. PATENT DOCUMENTS

| D. 244,682 | 6/1977 | Miner | 172/42 X |
|---|---|---|---|
| 1,506,042 | 8/1924 | Bauer | 172/43 |
| 2,574,353 | 11/1951 | Singer | 172/42 |
| 2,643,599 | 6/1953 | Wharton | 172/57 |
| 4,049,059 | 9/1977 | Weibling | 172/41 X |
| 4,121,668 | 10/1978 | Miner | 172/42 |

FOREIGN PATENT DOCUMENTS

| 829239 | 1/1952 | Fed. Rep. of Germany | 172/42 |
|---|---|---|---|
| 1376521 | 9/1964 | France | 172/42 |
| 2495529 | 6/1982 | France | 172/41 |
| 654230 | 6/1951 | United Kingdom | 172/43 |
| 678509 | 9/1952 | United Kingdom | 172/42 |
| 1441015 | 6/1976 | United Kingdom | 172/43 |

Primary Examiner—Richard J. Johnson
Assistant Examiner—Terrence L. B. Brown

[57] ABSTRACT

A fulcrum assembly for a tiller of the type having auger shafts usable in a horizontal or vertical disposition provides a fulcrum point between the handle bars and the auger shafts, so that during operation by moving the tiller handle down an operator can change the downward motion of the auger shafts to an upward motion, thereby enabling the retrieval of the auger shafts from the soil after vertical augering.

10 Claims, 5 Drawing Figures

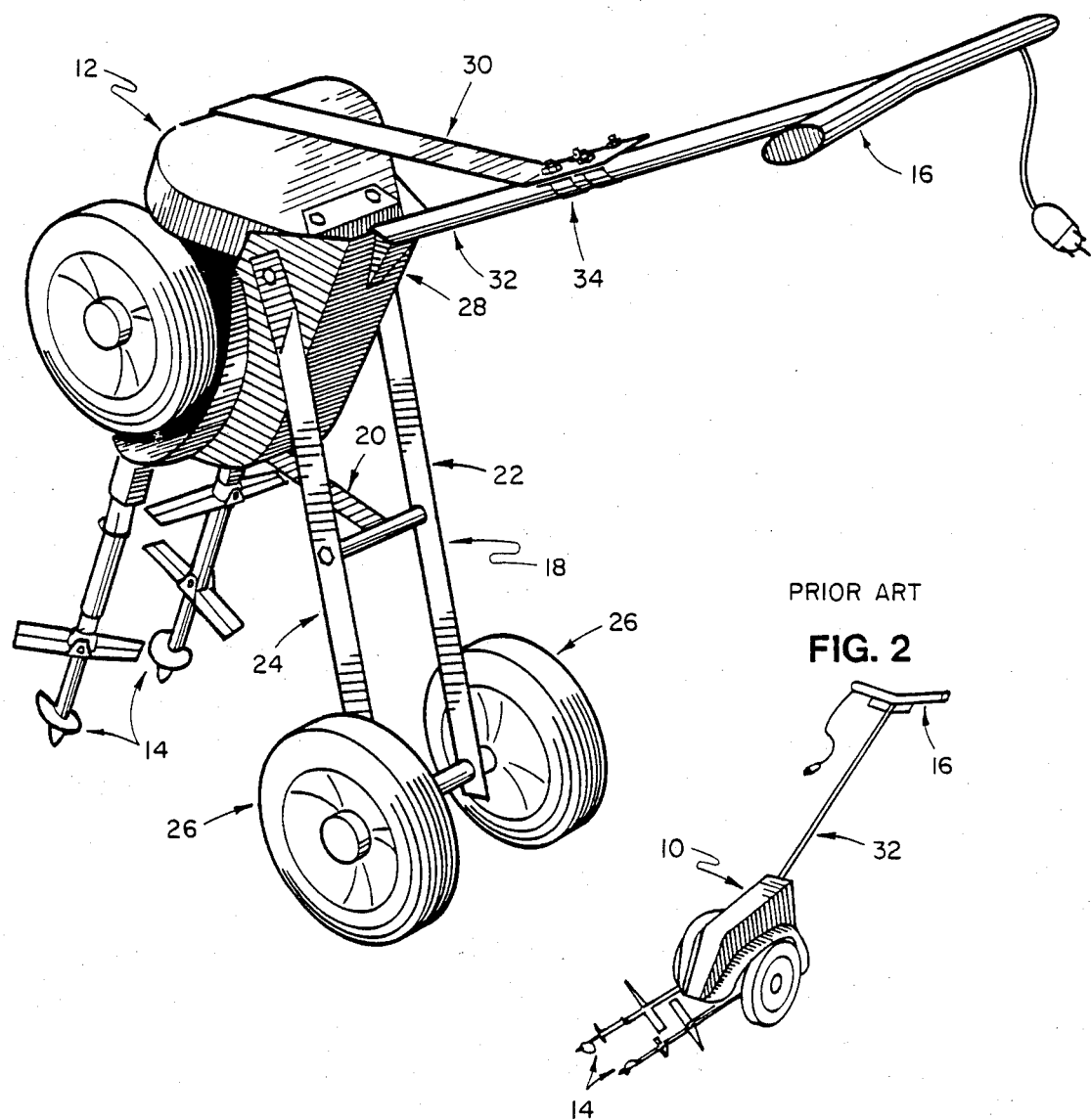

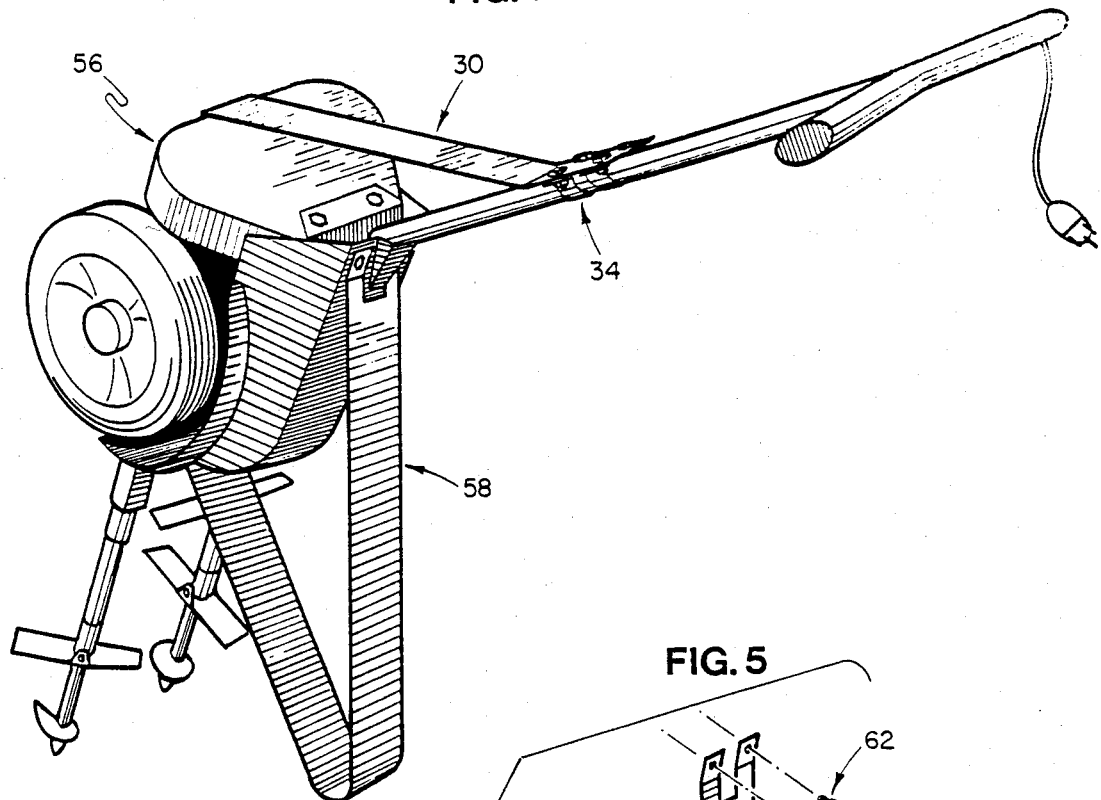
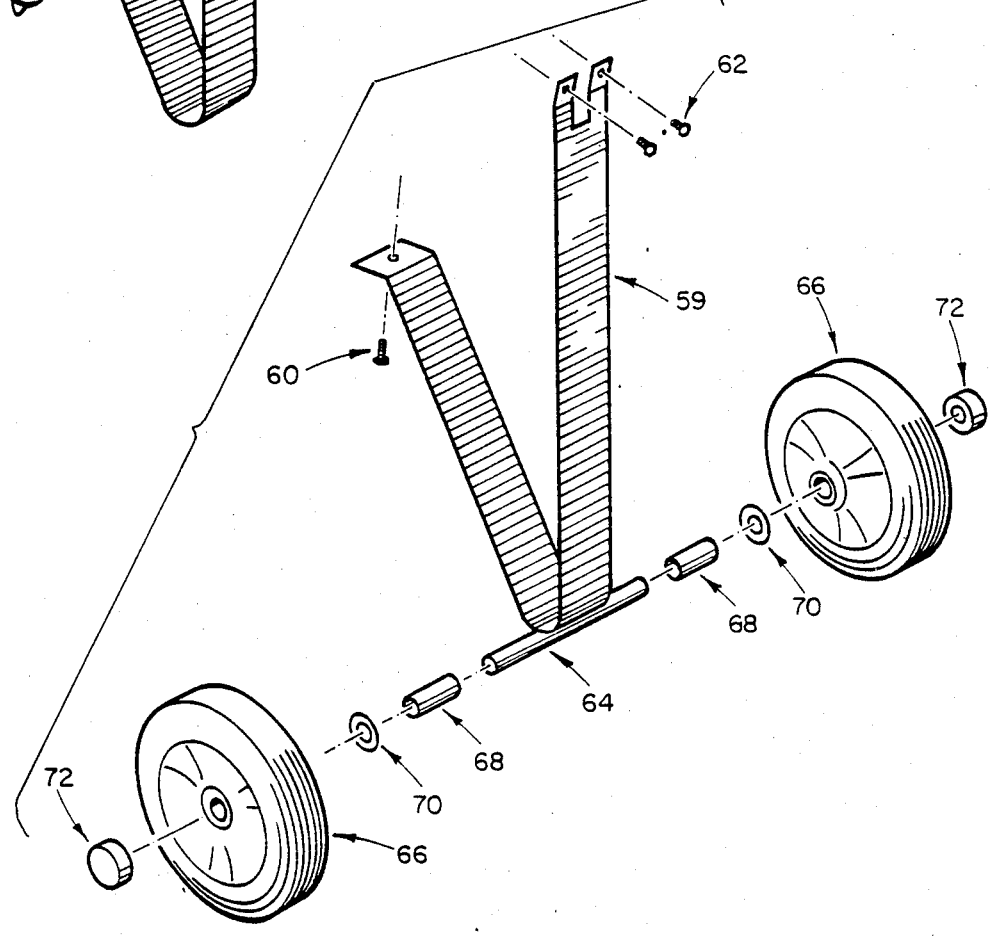

GARDEN TILLER ATTACHMENT

BACKGROUND OF THE INVENTION

The prior art garden tiller, U.S. Pat. No. Des.244,682, although capable of vertically augering into the soil to the garden tiller's maximum augering depth, said garden tiller is unable to be retrieved from the soil after being vertically augered into the soil except by other external means such as being dug out with a shovel.

SUMMARY OF THE INVENTION

It is the object of the new invention to provide the prior art garden tiller, U.S. Pat. No. Des.244,692, with a means of support in said garden tiller's inverted position; to provide a fulcrum point advantageously located between the bladed auger shafts and the handle bars of said prior art garden tiller so that during vertical augering when downward pressure is applied to the handle bars of said garden tiller the rotating bladed auger's downward movement into the soil can become stationary and changed to an upward movement thereby retrieving the rotating bladed auger shafts from the soil.

BRIEF DESCRIPTION OF THE DRAWINGS

FIG. 1 is a view of the new invention attached to the prior art garden tiller, U.S. Pat. No. Des.244,682, with said garden tiller in an inverted position for vertical augering.

FIG. 2 is a view of the said prior art garden tiller in the normal position for horizontal operation.

FIG. 4 is a view of an alternate form of the new invention attached to the prior art garden tiller, U.S. Pat. No. Des.244,682.

FIG. 5 is an exploded view of new invention portion of FIG. 4 to which said portion an axle, wheels, and associated assembly parts have been added to create still another alternate form of the new invention.

DESCRIPTION

Figure 3:
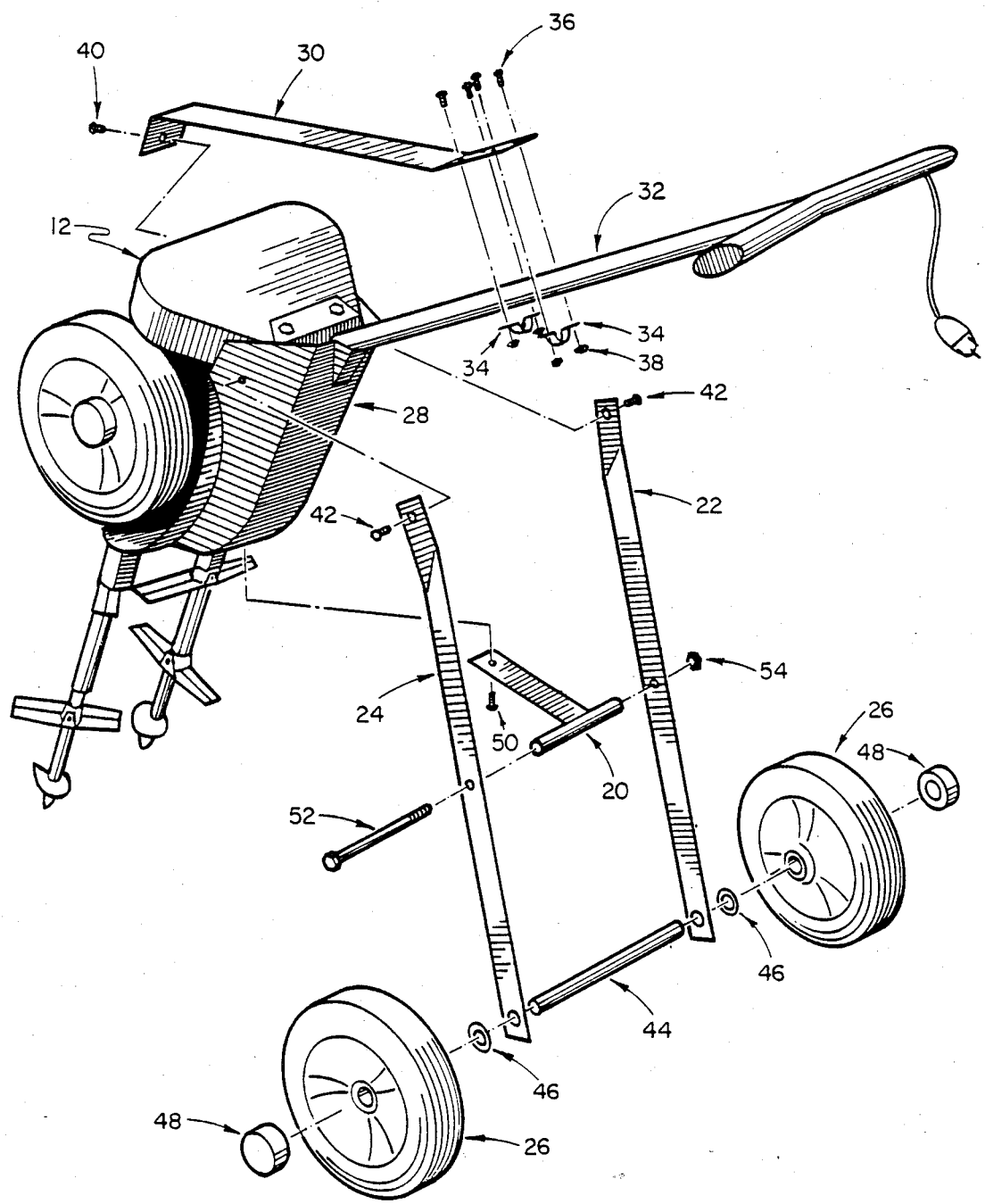
FIG. 3 is an exploded view of the new invention showing how the parts, including the handle brace, are assembled and attached to the prior art garden tiller, U.S. Pat. No. Des.244,682.

To realize the need for the new invention, the functional capability of a prior art garden tiller, U.S. Pat. No. Des.244,682, as shown in FIG. 2 and designated by the numeral 10, must first be explained.

If prior art tiller 10 were inverted to the position of tiller 12 embodying the present invention as shown in FIG. 1, with the tips of the auger shafts 14 resting on the soil to be tilled, then lifting the handlebars 16 in an upward direction would align the auger shafts 14 into a substantially vertical augering position.

With prior art tiller 10 in a vertical augering position, applying electricity to the electric motor (not shown) causes the auger shafts 14 to rotate and auger downwardly until firmly lodged in the soil at the maximum augering depth. This leaves the auger shafts 14 buried in the soil with no operational way of removal.

A tiller embodying the present invention is shown in FIG. 1 and designated generally as 12. The invention comprises a fulcrum assembly 18 comprising braces 20, 22 and 24 and wheels 26. The wheels 26 are coupled with braces 22 and 24 which are mounted on a cover 28. The brace 20 is also mounted on the cover 28 and is coupled with braces 22 and 24. When the tiller 12 is inverted to the position shown in FIG. 1, the auger shafts 14 are positioned at an angular relationship with respect to the surface of the soil. Lifting the handlebars 16 in an upward direction places the tiller 12 in a vertical augering position, with the wheels positioned above the soil. Applying electricity to the electric motor causes the auger shafts 14 to rotate and auger downwardly until the wheels 26 come in contact with the soil. Applying some downward pressure on handlebars 16 stops the downward movement of the auger shafts 14, allowing the auger shafts 14 to continue to rotate, thereby pulverizing the soil. During continued rotational operation of the auger shafts 14, additional downward pressure on the handlebars 16 forces the auger shafts 14 into an upward movement, thereby retrieving the auger shafts from the soil. With the auger shafts now out of the soil, the operator can locate adjacent positions for more vertical augerings.

The components of the present invention are shown in FIG. 3. A handle brace 30 is coupled at one end with handle rod 32 by brackets 34, screws 36 and nuts 38. The handle brace 30 is mounted at the other end to the tiller by a screw 40. The handle brace 30 provides additional bracing to prevent damage to handle rod 32.

Braces 22 and 24 are mounted to cover 28 by screws 42. Wheels 26 are mounted to the braces 22 and 24 by axle 44, washers 46, and caps 48. The brace 20 is mounted to the cover 28 by a screw 50 and is coupled with braces 22 and 24 by a bolt 52 and a nut 54.

A tiller utilizing an alternate embodiment of the present invention is shown in FIG. 4 and is designated generally as 56. A fulcrum brace 58 is mounted to the cover of the tiller and serves the same purpose as the fulcrum assembly 18 shown in FIG. 1. Fulcrum brace 58 does lack the mobility of the wheels 26 of the assembly 3.

FIG. 5 shows a wheeled version of the fulcrum brace 58 shown in FIG. 4. Screws 60 and 62 serve to mount the fulcrum brace 59 to a tiller. An axle 64 is welded onto fulcrum brace 59 and wheels 66 are coupled with axle 64 by spacers 68, washers 70, and caps 72.

I claim:

1. An auxiliary support attachment for a garden tiller wherein the tiller includes a frame supported by wheel means, a pair of forwardly extending auger-like tilling means, and a rearwardly and upwardly extending handle, said tiller being adapted to be used in a wheel-supported position with the augers extending generally forwardly and in an inverted position with the augers in a generally vertical position with the wheel means elevated off the ground, the attachment comprising a fulcrum assembly adapted to support the tiller in the inverted position, said assembly comprising:

a first brace member, adapted to be attached to the tiller and extending generally upwardly and forwardly and provided with a ground-engaging means at the lower end thereof, a second brace member secured to said first brace member at one end and adapted to extend forwardly and be secured to said tiller at the opposite end, fastening means for attaching said brace members to said tiller at their respective forward ends, whereby the ground-engaging means on the lower end of said first brace member is adapted to engage the ground, such that said wheel means is out of engagement with the ground, and by vertical manipulation of said handle during operation said auger filling means may be pivotally inserted into and withdrawn from the ground.

2. The attachment of claim 1 further comprising auxiliary wheel means attached to the lower end of said first brace member, whereby the tiller may be readily transported on said auxiliary wheel means when said tilling means has been withdrawn from the ground, and whereby said wheel means is kept out of engagement with the ground.

3. The attachment of claim 1, wherein said first brace member comprises a pair of generally parallel support members.

4. The attachment of claim 1, wherein said first and second brace members comprise a generally V-shaped unitary member.

5. The attachment of claim 1 further comprising a third brace member adapted to be attached to the tiller frame and to the handle, whereby the handle is strengthened for manipulation of said auger tilling means.

6. The attachment of claim 2, wherein said first and second brace members comprise a generally V-shaped, unitary member.

7. The attachment of claim 3 further comprising a third brace member adapted to be attached to the tiller frame and to the handle, whereby the handle is strengthened for manipulation of said auger tilling means.

8. The attachment of claim 4 further comprising a third brace member adapted to be attached to the tiller frame and to the handle, whereby the handle is strengthened for manipulation of said auger tilling means.

9. The attachment of claim 2, wherein said first brace member comprises a pair of generally parallel support members.

10. The attachment of claim 2 further comprising a third brace member adapted to be attached to the tiller frame and to the handle, whereby the handle is strengthened for manipulation of said auger tilling means.

* * * * *